Patented Dec. 25, 1951

2,579,669

UNITED STATES PATENT OFFICE 2,579,669

CATALYTIC ISOMERIZATION OF ACETYLENIC HYDROCARBONS

John C. Hillyer and Joseph F. Wilson, Bartlesville, Okla., assignors to Phillips Petroleum Company, a corporation of Delaware No Drawing. Application December 6, 1948,
Serial No. 63,846

7 Claims. (Cl. 260—678)

This invention relates to the isomerization of unsaturated hydrocarbons. In one aspect this invention relates to the isomerization of olefinic hydrocarbons so as to shift the unsaturated linkage toward the center of the carbon chain. In another aspect this invention relates to the isomerization of acetylenic hydrocarbons so as to shift the unsaturated linkage toward the center of the carbon chain. This invention is useful for the production of 2-alkenes from 1-alkenes. This invention is also useful for the production of 2-alkynes from 1-alkynes.

Monounsaturated hydrocarbons of four or more carbon atoms to the molecule may occur in several isomeric forms with respect to the location of the unsaturated linkage. That is, the point of unsaturation may be in a terminal position or may be between any two adjoining carbon atoms up to and including the center position. Thus in the simplest case, namely that of n-butene, two such isomers are possible, 1-butene and 2-butene. Similarly, n-hexyne, an acetylenic hydrocarbon, occurs in three isomeric forms, namely 1-hexyne, 2-hexyne, and 3-hexyne.

Unsaturated hydrocarbons occur or are formed as products from various manufacturing processes, and in such instances, the said products comprise both those in which the unsaturated linkage is in a terminal position and those where it is more centrally located in the carbon chain. While in some instances these isomers are formed in substantially equal amounts, it often occurs that the 1-isomer is the principal product. For example, in the synthesis of hydrocarbons from hydrogen and carbon monoxide over iron or cobalt-thoria catalysts, high boiling olefins are formed in considerable amounts, these being principally 1-olefins. Also olefins obtained from various natural fats through the corresponding alcohols are substantially all 1-olefins. In a similar manner, alkynes above the simple two and three carbon atom members of the series are now being produced in commercial quantities from synthetic processes and these, like the aforementioned olefins, are essentially those having the unsaturated linkage in the terminal position.

While unsaturated hydrocarbons, either alkenes or alkynes, having the unsaturated linkage in the terminal position have valuable uses in the chemical industries, there are numerous applications in which only those having the point of unsaturation in, say the 2-position, are usable or desirable. Thus some means for converting an unsaturated hydrocarbon into a corresponding unsaturated hydrocarbon wherein the unsaturated linkage is in a more central position in the carbon chain is desirable.

The conversion of 1-olefins to 2-olefins has heretofore been proposed by the use of acid catalysts, these materials including primarily such non-volatile acids as sulfuric, phosphoric, and the like, either as liquids or on suitable supporting materials. When operating with acid catalysts in the liquid form or in aqueous solutions, large amounts of hydrocarbon are lost in the formation of polymers, alcohols, ethers, etc., thus rendering such processes inefficient and wasteful. While such losses are alleviated to some extent by the use of solid carriers such as silica gel, petroleum coke, fuller's earth and the like impregnated with an aqueous solution of the non-volatile acid catalyst, these advantages are realized only at the expense of lowering catalyst strength by dilution of the acid, the carefully controlled addition of water vapor to the feed stream, and the like, expedients which reduce the operating efficiency of equipment and operations.

It is an object of this invention to provide a novel process for isomerizing unsaturated hydrocarbons in a manner such that an unsaturated linkage is shifted toward the center of the carbon chain of the hydrocarbon molecule.

It is another object of this invention to provide a novel process for shifting an unsaturated linkage of an unsaturated hydrocarbon toward the center of the carbon chain of the hydrocarbon molecule without isomerization in the skeletal configuration of the hydrocarbon molecule.

It is a further object of this invention to provide a novel process for the isomerization of olefinic hydrocarbons so as to shift the unsaturated linkage toward the center of the carbon chain of the hydrocarbon molecule.

It is a further object of this invention to provide a novel process for the isomerization of acetylenic hydrocarbons so as to shift the unsaturated linkage toward the center of the carbon chain of the hydrocarbon molecule.

It is another object of this invention to isomerize 1-alkenes to 2-alkenes.

It is a further object of this invention to isomerize 1-alkynes to 2-alkynes.

It is another object of this invention to isomerize 1-butene to 2-butene.

It is a further object of this invention to isomerize 1-pentyne to 2-pentyne.

Further and additional objects will be manifest from the disclosure hereinbelow.

We have found that, at suitable reaction conditions, unsaturated hydrocarbons can be isomerized to form corresponding unsaturated hydrocarbons having an unsaturated carbon-to-carbon linkage in a more central position in the carbon chain in the presence of anhydrous hydrogen fluoride and in the presence of a suitable catalyst.

The hydrocarbons that are used in our process contain an olefinic or an acetylenic linkage in the carbon chain in a position that the unsaturated linkage can be shifted toward the center of the carbon chain and, in order that our isomerization reaction can be effected, the hydrocarbon must contain at least four carbon atoms per molecule. The hydrocarbon may contain as many as twenty carbon atoms per molecule, but we prefer to carry out our process with those hydrocarbons containing no more than twelve carbon atoms per molecule.

The hydrocarbons obtained from our process are dependent upon the reactant unsaturated hydrocarbons that are used, and the hydrocarbon products will contain an unsaturated carbon-to-carbon linkage in a more central position within the carbon chain than the reactant unsaturated hydrocarbons. For example, 1-butene is isomerized to 2-butene. 1-hexene is isomerized to 2-hexene. 1-heptene is isomerized to 2-heptene. 1-pentyne is isomerized to 2-pentyne, and 1-hexyne is isomerized to 2-hexyne. 2-hexene is isomerized to 3-hexene, and 2-hexyne is isomerized to 3-hexyne.

Throughout our specification we refer to unsaturated hydrocarbons as including olefinic and acetylenic hydrocarbons, but we do not intend to imply that the olefinic and acetylenic types of hydrocarbons are equivalents in our process. We have found that the two types of unsaturated hydrocarbons can be used, but the fact that the olefinic type can be used would not lead one skilled in the art to believe that the acetylenic type can also be used in our process. Actually, it would be expected that with the acetylenic types hydrofluorination of the hydrocarbon would be more likely to occur than with the olefinic types. The difluoro hydrocarbon derivatives resulting from the hydrofluorination of the acetylenic types are considerably more stable than the monofluorides resulting from the hydrofluorination of the olefinic types, and one skilled in the art, knowing that the olefinic types can be isomerized in our process, would expect that the acetylenic types would be hydrofluorinated instead of isomerized. Further, the reaction shifting the unsaturated linkage in an acetylenic hydrocarbon is different from the reaction using an olefinic type, because with the latter type the migration of only one hydrogen atom toward the terminal carbon atom is involved but with the acetylenic type the migration of two hydrogen atoms is involved.

For a catalyst in our process we use aluminum oxide, aluminum fluoride or mixtures of the two aluminum compounds. The aluminum oxide may be in the form of synthetic aluminum oxide, a bauxite having a low silica content or activated alumina which is a highly porous granular form of aluminum oxide. Mixtures of aluminum oxide and aluminum fluoride in any desired proportions may be used to catalyze our reaction. A preferred mixture of these compounds contains from 70 to 95 weight per cent aluminum fluoride and from 5 to 30 weight per cent aluminum oxide, and, if desired, the oxide may be used as a support for the fluoride. The catalyst is preferably in either a pelleted or a granular form, and it may be employed as a fixed bed of coarse granules, as a bed of finely divided particles in ebullient motion in a stream of upward flowing reactants, or as a stream of finely divided particles passing through a reaction zone.

The temperature employed in our process is within the range of 300 to 700° F. preferably from 450 to 600° F. In general, temperatures not above 500° F. are more effective than the higher temperatures with the acetylenic hydrocarbons in our process, but with the olefinic hydrocarbons the higher temperatures are preferred. At temperatures below 300° F. rapid declines in reaction rates are observed, and at temperatures above 700° F. decomposition of the hydrocarbon takes place.

The reaction pressure is preferably atmospheric, but higher and lower pressures may be used. The reaction mixture may contain only the unsaturated hydrocarbon, the hydrogen fluoride and the catalyst, or, if desired, it may contain a diluent which is inert under the reaction conditions, such as nitrogen, methane, carbon tetrafluoride, etc. When elevated pressure are used, particularly when operating with an acetylenic hydrocarbon, it is desirable to employ an inert diluent gas to reduce the partial pressure of the hydrocarbon to atmospheric pressure in order to minimize the formation of polymers and explosion hazards.

In practicing our invention we use a molar ratio of hydrogen fluoride to unsaturated hydrocarbon less than 1:1. Our preferred range of molar ratios is from 0.3 to 0.85. When operating with these molar ratios some hydrofluorination of the unsaturated hydrocarbon occurs, and our examples below so indicate, but the isomerized unsaturated hydrocarbon and not the hydrofluorination products are the principal reaction products. In our copending application, Serial No. 792,832, filed December 19, 1947, which issued as Patent No. 2,471,525 and of which this application is a continuation-in-part, we disclosed a process for the hydrofluorination of acetylenic hydrocarbons in the presence of aluminum oxide and aluminum fluoride catalysts. In that application we specified molar ratios of reactants higher than those required in the instant process, and, as a consequence, the principal reaction products differ in the two processes.

Flow rates of the hydrogen fluoride and unsaturated hydrocarbon reactants in our process are dependent upon the temperature employed. Generally, the space velocity of the reactants is within the range of 50 to 1000 volumes of reactants per volume of catalyst space per hour, and we prefer to use a contact time of 0.5 to 25 seconds.

In one specific embodiment our invention is effected by admixing a 1-alkene or 1-alkyne feed stock with a small molal proportion of anhydrous hydrogen fluoride gas and passing the mixture through a reaction zone containing an alumina catalyst at a temperature in the range 300 to 700° F. at a rate such that unsaturated vapors are exposed to the action of the said catalyst for a period of from about 0.5 to about 10 seconds. After cooling and condensing the effluent vapors, hydrogen fluoride is removed by washing, and the product is distilled to yield a pure 2-alkene or 2-alkyne. When operating with higher boiling unsaturated hydrocarbons, a preheating zone may be required to vaporize the feed stock prior to its introduction into the catalyst zone. In some instances it may be desirable to supply an additional separation or treatment step to remove traces of hydrofluoride addition products or of unconverted 1-unsaturates prior to distillation of the product.

Processes heretofore employed for the isomerization of olefins have been concerned principally with shifts in the skeletal configuration of the hydrocarbon. For example, 1-butene has been converted to isobutene by a variety of reagents. In such operations rupture of the carbon chain is involved with subsequent migration of a methyl or other alkyl group to a new position, thus forming a branched chain structure. While we have referred to our process as an isomerization operation, it is not to be confused with the aforementioned skeletal transformations, even though the latter may also be designated as isomerization procedures.

Although we have made specific reference to those unsaturated hydrocarbons containing only one unsaturated carbon-to-carbon linkage per molecule, the scope of our invention is not to be so limited. Unsaturated hydrocarbons containing more than one unsaturated linkage per molecule can also be isomerized in our process, and non-conjugated diolefins and diacetylenes are within the scope of our invention. Such unsaturated hydrocarbons include as examples 1,7-octadiene, 1,6-heptadiene, 1,9-decadiene, 1,6-heptadiyne, 1,7-octadiyne, 1,9-decadiyne and the like.

*Example I*

A stream comprising 1-butene and anhydrous HF in the ratio of 2 mols of butene to one of HF was passed over a pelleted alumina catalyst maintained at a temperature of 500° F., the pressure being atmospheric. A space velocity of 350 volumes per volume catalyst per hour was used, resulting in a contact time of 3.1 seconds. A butene concentrate comprising 88 per cent of the feed was recovered which upon analysis was found to contain 93 per cent 2-butene and 7 per cent unreacted 1-butene. No isobutylene was formed, the balance of the charge being recovered as 2-fluorobutane.

*Example II*

The run of Example I was repeated using a feed mixture of 1-butene and hydrogen fluoride in a mol ratio of 1:0.8. The flow rate was 646 volumes per volume catalyst per hour, equivalent to a contact time of 1.75 seconds. Pressure was atmospheric. A yield of 63 per cent butene comprising 87 per cent 2-butene and 13 per cent unreacted 1-butene was realized. No isobutene was formed. The balance of the charge was recovered as 2-fluorobutane.

*Example III*

The run of Example I was repeated, using a catalyst preparation comprising pelleted aluminum fluoride. A ratio of 5 mols of butene-1 to 1 mol of HF was employed. The butene was quantitatively recovered, and 90 per cent was found converted to 2-butene with no isobutene.

*Example IV*

1-pentyne was mixed with 0.75 mol of anhydrous HF per mol of the acetylene and passed over a pelleted alumina catalyst at atmospheric pressure and 400° F. A flow rate of 65 v./v./hr. was used. In the acetylene recovered in the effluent, 2-pentyne comprised the great majority of the product. Only traces of acetylene polymers were found. No fluoropentene was formed, and only a small per cent of the acetylene was converted to 2,2-difluoropentane.

*Example V*

The test of Example IV was repeated using 1-hexyne. After the conversion, a recovery of 75% of the hexyne was obtained unfluorinated, the balance appearing as 2,2-difluorohexane. The product contained a considerable proportion of 2-hexyne.

From the above disclosure various modifications of our invention will be apparent to those skilled in the art.

We claim:

1. The process which comprises contacting a reaction mixture comprising hydrogen fluoride and an acetylenic hydrocarbon containing no more than 20 carbon atoms per molecule in a molar ratio less than 1:1 with a catalyst selected from the group consisting of aluminum oxide, aluminum fluoride, and aluminum oxide-aluminum fluoride composite at a temperature within the range of 300 to 700° F., so as to produce chiefly an acetylenic hydrocarbon of the same skeletal structure containing an acetylenic linkage in a more central position in the carbon chain than in said first-named acetylenic hydrocarbon.

2. A process according to claim 1 wherein the first-named acetylenic hydrocarbon is a 1-alkyne and the acetylenic hydrocarbon recovered is a 2-alkyne.

3. A process according to claim 1 wherein the first-named acetylenic hydrocarbon is 1-pentyne and the acetylenic hydrocarbon recovered is 2-pentyne.

4. A process according to claim 1 wherein the acetylenic hydrocarbon contains from 4 to 12 carbon atoms per molecule.

5. A process according to claim 1 wherein the catalyst is aluminum oxide.

6. A process according to claim 1 wherein the catalyst is aluminum fluoride.

7. A process according to claim 1 wherein the catalyst is aluminum oxide-aluminum fluoride.

JOHN C. HILLYER.
JOSEPH F. WILSON.

REFERENCES CITED

The following references are of record in the file of this patent:

UNITED STATES PATENTS

| Number | Name | Date |
|---|---|---|
| 2,289,375 | Mattox | July 14, 1942 |
| 2,324,708 | Liedholm | July 20, 1943 |
| 2,397,085 | Boedeker et al. | Mar. 26, 1946 |
| 2,397,639 | Berg et al. | Apr. 2, 1946 |
| 2,450,039 | Frey | Sept. 28, 1948 |
| 2,471,647 | Oblad et al. | May 31, 1949 |

FOREIGN PATENTS

| Number | Country | Date |
|---|---|---|
| 534,151 | Great Britain | Feb. 28, 1941 |